United States Patent [19]
Bianco

[11] 3,834,055
[45] Sept. 10, 1974

[54] FISHING POLE HOLDER AND CATCHING DEVICE

[76] Inventor: Umberto Dal Bianco, 1051 65th St., Oakland, Calif. 94621

[22] Filed: Aug. 28, 1973

[21] Appl. No.: 392,258

[52] U.S. Cl. .................................................. 43/15
[51] Int. Cl. ............................................ A01k 97/10
[58] Field of Search .............................. 43/15, 16

[56] References Cited
UNITED STATES PATENTS
2,908,099  10/1959  Burke ................................... 43/16
3,410,015  11/1968  Garcia, Jr. ............................. 43/15

*Primary Examiner*—Warner H. Camp
*Attorney, Agent, or Firm*—William R. Piper

[57] ABSTRACT

A fishing pole holder and catching device which may be removably clamped to a supporting member in a boat or the device has a spike that may be driven into the ground for supporting the device. The device has an arm for holding a fishing rod and the arm is swingably secured to a base. Novel adjustable means holds the arm and fish pole in an operative and inclined position preparatory to catching a fish. This adjustable means includes a spring biased pawl and a ratchet for holding the arm and fishing rod in the operative position into which they have been swung. A leaf spring swings the arm and fish pole into a vertical position when the spring biased pawl is automatically freed from the ratchet when there is a pull on the fish line and pole due to a fish being caught by the fish hook.

4 Claims, 5 Drawing Figures

FISHING POLE HOLDER AND CATCHING DEVICE

BACKGROUND OF THE INVENTION

Field of the Invention.

Many fisherman would welcome using a fish pole holding device that would support a fish pole in an operative position for catching a fish without the necessity of the fisherman holding the pole. This would free the fisherman's hands to do other things while waiting for a fish to bite. The device would have a greater appeal to the fisherman if it had a novel release mechanism that would automatically swing the fishing pole into an upright position when a fish pulled on the fish hook and fish line in taking the bait, thus causing the hook to catch the fish and the vertical position of the pole to signal the fisherman that a fish had been caught. The present fishing rod holder and catching device accomplishes all of these features.

SUMMARY OF THE INVENTION

An object of my invention is to provide a fish pole holder and fish catching and signalling device that may be readily attached to a part of a fishing boat, such as a seat, etc., and will hold a fishing pole in an operative position for catching a fish, thereby freeing the fisherman to do other things while waiting for a fish to bite. The device has automatic means for swinging the fishing pole into an upright position when a fish bites, thus causing the hook to catch the fish and the upright position of the pole to signal the fisherman that a fish had been caught.

A further object of my invention is to provide a fish pole holder and fish catching and signalling device in which a pawl and ratchet mechanism makes it possible to swing the pole into a desired angular position and to hold the pole in that position. The pawl is spring-biased and will automatically be freed from the ratchet when a fish bites and pulls on the fish line. A leaf spring thereupon will swing the pole into an upright position and will pull on the fish line for causing the hook to catch the fish.

DESCRIPTION OF THE PREFERRED EMBODIMENT

Figure 1:
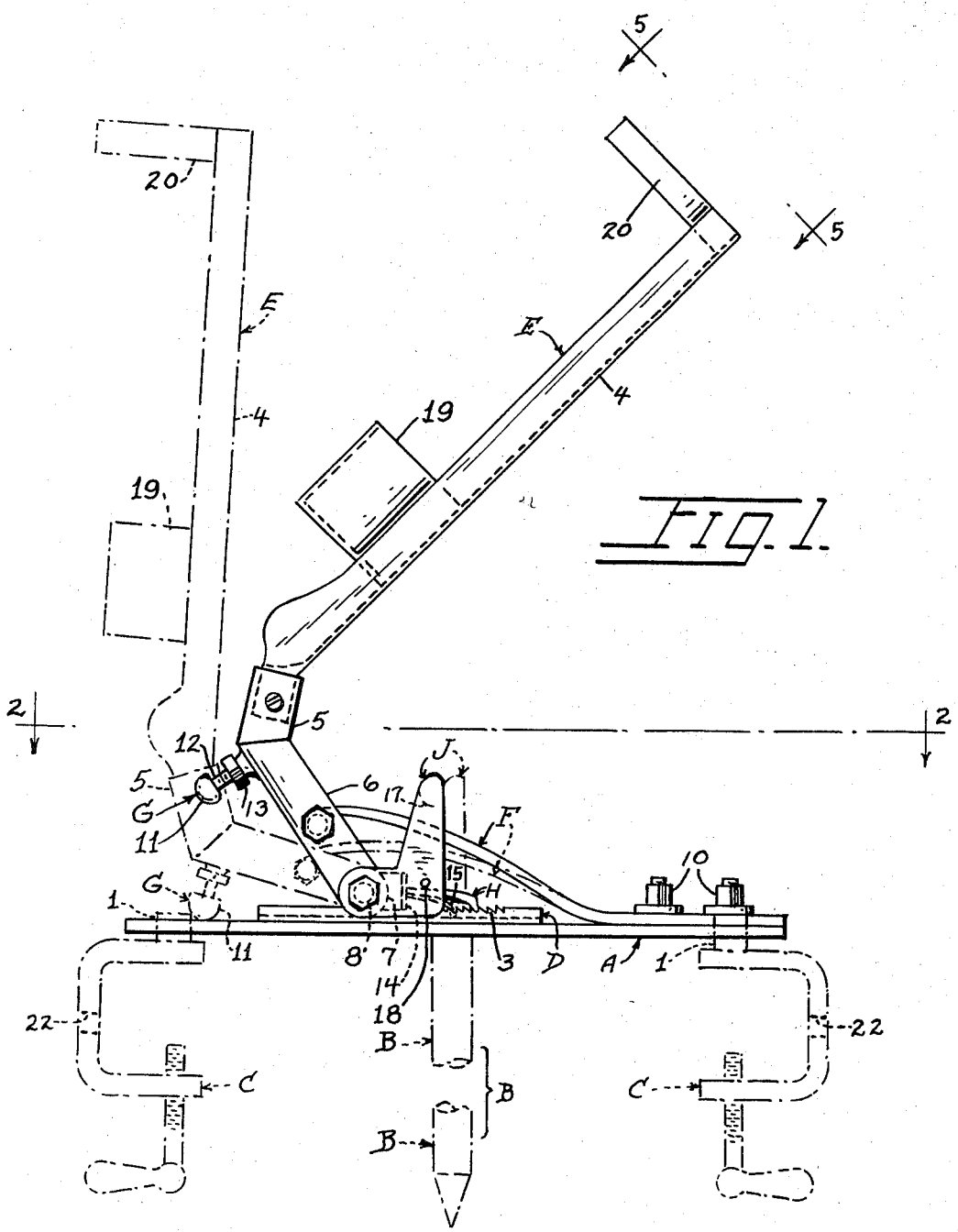
FIG. 1 is a side elevation of the device and shows the fish pole holding arm in an operative position by full lines and in a signalling position by dot-dash lines.
Figure 2:
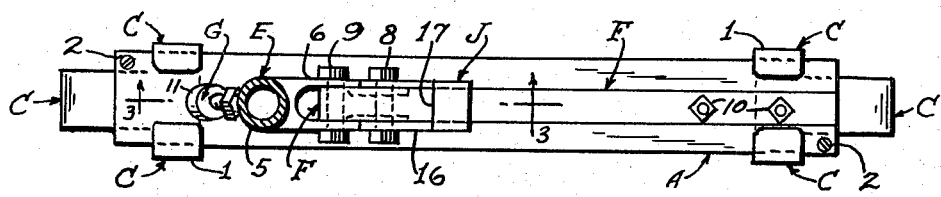
FIG. 2 is a plan view of a portion of the device and is taken along the line 2—2 of FIG. 1.

In carrying out my invention I provide a base plate indicated generally at A in FIGS. 1 to 4 inclusive. This base plate may be supported by a spike B, which may be driven into the ground, or by clamps C, which may be attached to a seat in a boat, etc. Both the spike and clamps are shown by dot-dash lines in FIG. 1. The spike B has a reduced threaded portion that is received in a threaded opening provided in the base plate. FIG. 2 shows a top plan view of the clamps C in full lines and both clamps have integral channel-shaped members 1 that can be slid onto the ends of the base plate A and then are held against accidental removal by screws 2. The clamps, when secured to a boat seat, etc., not shown, or any other desired support, will secure the base plate in place.

Figure 3:
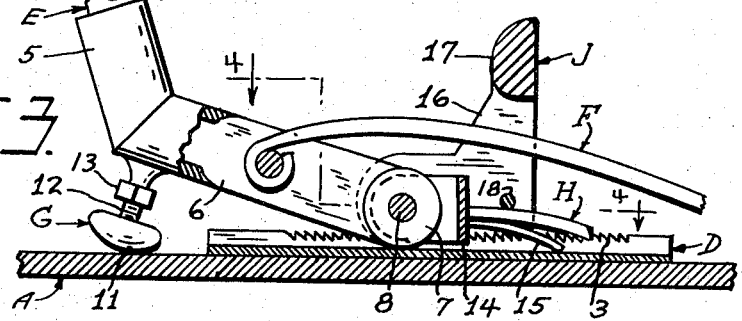
FIG. 3 is an enlarged longitudinal section through a portion of FIG. 2 and is taken along the line 3—3 of FIG. 2.
Figure 4:
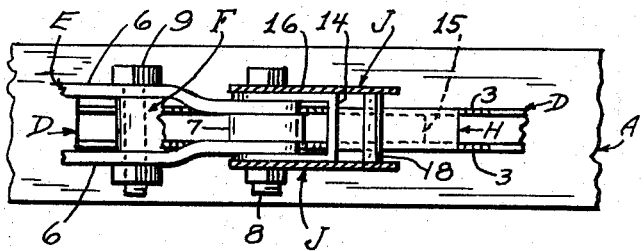
FIG. 4 is a top plan veiw of a part of FIG. 3 and is taken along the line 4—4 of FIG. 3.
Figure 5:
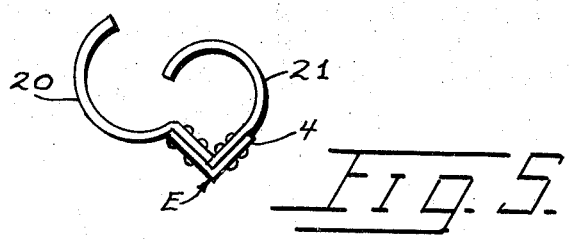
FIG. 5 is an end view of the fish pole holding arm when looking in the direction of the arrows 5—5 in FIG. 1.

The base plate A has a channel rack D, see FIGS. 1, 3 and 4, and the two sides of the channel rack extend upward with ratchet teeth 3 formed in a portion of their lengths, see FIG. 3. A fish pole holding arm E has a part 4 that is angle-shaped in cross section, see FIG. 5, and this part has its lower end mounted in a tubular part 5 that extends at an angle to the part 4, see FIG. 1. The lower end of the part 5 of the arm E is in the shape of a clevis 6 and a wheel 7 is rotatably mounted in the clevis 6, see FIGS. 3 and 4. The wheel rides in the channel rack D, and the two sides of the rack act as guides for the wheel as it travels along the base of the rack.

I provide a leaf spring F for yieldingly pressing on the part 6 of the arm E for holding the wheel in the channel rack and guide D, see FIGS. 1 and 3. The leaf spring F tends to swing the fish pole holding arm E in a counter clockwise direction about the axle 8 for the wheel 7, since the left hand end of the spring is connected to the shank of a bolt 9 that extends across the clevis of the arm E, as shown in FIGS. 3 and 4. The right hand end of the leaf spring F is anchored to the base plate A by bolts 10. The leaf spring tends to swing the fish pole holding arm into an inoperative position, as shown in FIG. 3 and by dot-dash lines as shown in FIG. 1.

An adjustable stop, indicated generally at G, is carried by the tubular part 5 of the fish pole holding arm E, see FIGS. 1, 2 and 3. The adjustable stop G includes head 11 with an integral threaded shank 12 that is adjustably received in a nut 13 that is secured to the tubular part 5. When the arm E is in inoperative position, the head 11 of the adjustable stop G contacts with the upper surface of the base plate A. The dot-dash line position of the arm E, in FIG. 1, shows the arm in inoperative position and it will hold the fish pole in practically a vertical position.

I will now describe the mechanism for holding the fish pole holding arm E in a cocked or operative position. In FIG. 4, I show a U-shaped member 14 that has its arms swingably supported by the shank of the bolt 8. This U-shaped member 14 carries an integral pawl H whose outer end can engage with the teeth 3 on the channel rack D. A short leaf spring 15 has one end secured to the undersurface of the pawl H, and its free end is slidably received between the sides of the channel rack and bears against the base of the rack for yieldingly urging said pawl out of engagement with the teeth 3.

A pawl depresser J has a pair of arms 16, see FIGS. 3 and 4, that straddle the U-shaped member 14 for the pawl H, and are pivotally carried by the shank of the bolt-axis 8 for the wheel 7. The two arms 16 of the pawl depresser J are interconnected by a finger piece 17, shown in cross section in FIG. 3. A pawl engaging rod 18 extends between the two arms 16 of the pawl depresser J and this rod contacts with the pawl H, and permits the operator to first swing the arm E into operative position, as shown by the full lines in FIG. 1, and then press to the right in FIG. 3, on the finger piece 17 for swinging the pawl depresser J in a clockwise direction about the bolt axle 8 and move the rod 18 down against the spring biased pawl H for overcoming the pressure of its short leaf spring 15 and moving the free end of the pawl into engagement with the teeth 3 in the channel rack D for holding the arm E in its operative position.

It should be noted at this point that the left hand end of the long leaf spring F, which is connected to the bolt 9 causes this bolt to act as a floating pivot on which the part 5 with its clevis 6, rotates. I have tried to show this in FIG. 1 where the bolt 9 is in one position when the arm E is in its operative position, as shown by the dot-dash lines and then the bolt is in another position when the arm E is swung into operative position, as shown by the full lines in the same Figure. This is caused by the wheel 7 riding in the channel rack guide D, as the part 5 of the arm E swings in a clockwise direction about the bolt 9 as a pivot. As the wheel 7 rolls to the left in FIG. 1 while the arm E is being swung into operative position, the short leaf spring 15 will swing the pawl H out of engagement with the teeth 3 of the channel rack and the pawl will act on the rod 18 to lift the rod and swing the pawl depresser about the axle 8 as a pivot. When the arm E has been swung into the desired operative position, the operator presses on the finger piece 17 to swing the pawl depresser clockwise about the axle 8 and cause the rod 18 to depress the pawl H, and overcome the resistance of the small leaf spring 15 and force the free end of the pawl into engagement with the teeth 3. The cut of the teeth 3 is such that the pressure of the long leaf spring F on the bolt 9 will tend to move the bolt toward the base plate A. Before this movement can take place, the part 5 of the arm E would have to swing about the bolt 9 and this would tend to move the wheel 7 to the right in FIG. 3. This movement is prevented because the pawl H engages with the teeth 3 and the slant of the teeth is such as to prevent the short leaf spring 15 from causing the pawl to be freed from the teeth. However, the two spring forces from the long leaf spring F to swing the arm E into inoperative position and the short leaf spring 15 to swing the pawl H free of the teeth 3, are so nicely balanced with respect to the slant of the teeth, that although the pawl will hold the arm in its operative position, only a slight pull on the arm E is needed to overbalance the long leaf spring F and permit the short leaf spring 15 to free the pawl H from the teeth, whereupon the long leaf spring will immediately return the arm E to its inoperative position, shown by the dot-dash lines in FIG. 1, and the stop G will strike the base plate A.

The fish pole holding arm E carries a cup-shaped member 19 for supporting the handle of a fishing pole, not shown, see FIG. 1. The outer end of the part 4 of the arm E carries two semi-circular arms 20 and 21 for receiving and holding another portion of the fishing pole.

OPERATION

From the foregoing description of the various parts of the device, the operation thereof may be readily understood. The base plate A is either supported by the spike B being driven into the ground or by the clamps C being secured to a boat seat of the like. The arm E is swung from its inoperative position, shown by the dot-dash lines in FIG. 1, into an operative position shown by the full lines in the same Figure. This swinging movement of the arm E will cause the part 5 of the arm to pivot about the bolt 9, and this will cause the wheel 7 to travel to the left in FIG. 1 and along the channel rack D. The spring biased pawl H will move over the teeth 3 of the rack D. When the proper angular position of the arm E is reached, the operator will press on the finger piece 17 to swing the pawl depresser J, and the rod 18 of the depresser will swing the pawl downwardly into engagement with the teeth 3. The arm E will now be held in operative position.

The fishing pole, not shown, is inserted in the cup 19 of the arm E and is received by the semi-circular arms 20 and 21. The hook, not shown, on the fishing line, not shown, is baited and dropped into the adjacent body of water. As already stated, the balance between the spring biased pawl H, and the long leaf spring F, and the inclination of the teeth 3 is such that only a slight pull of a fish on the hook and fish line is sufficient to pull on the outer end of the fishing pole and swing the pole and arm E to free the pawl H from the teeth 3, whereupon the short spring 15 will free the pawl from the channel rack D, and the long leaf spring F will immediately swing the arm E into its inoperative dot-dash line position shown in FIG. 1. This swinging movement of the arm E and the fish pole will cause the hook to catch the fish. At the same time the almost vertical position of the arm E and fish pole will signal the fisherman that a catch has been made. It will be noted from FIG. 1 that each of the clamps C has a threaded opening midway between the two ends of the clamp. This is for the purpose of using the clamps to secure the device to the side of a boat. The clamps are reversed in their positions from that shown in FIG. 1 and the base A is placed on top of the side of the boat and then the clamps are moved along the base so as to straddle the side of the boat. The threaded shanks of the clamps are removed from the ends of the clamps and are threaded through the openings 22 until they grip the adjacent surface of the side of the boat and in this manner secure the device to the boat.

I claim:

1. A fishing pole holder and catching device comprising:

a. a base with a channel-shaped rack on its upper surface;

b. a fish pole holding arm movably supported by a wheel at its lower end that rolls in said channel-shaped rack;

c. a leaf spring having one end secured to said base and its other end pivotally connected to said arm and near said wheel for yieldingly urging said arm to swing from an operative position into an inoperative position where the arm in this latter position will signal that a fish has been caught;

d. a pawl associated with said arm and positioned near said wheel and adapted to ride over the teeth in the channel-shaped rack as the arm is swung toward operative position, this swinging movement of said arm about the pivotal connection of the leaf spring with the arm as a center causing the arm to increase the tension of said spring and to move the wheel along said channel-shaped rack as well as causing the pawl to move over the rack teeth;

e. said rack teeth being shaped for holding said pawl and arm against accidental return movement to an inoperative position; and f. a second spring yieldingly urging said pawl out of engagement with said rack teeth as soon as a slight pull on the outer end of the arm swings the arm through a slight arc for moving the wheel and pawl a very short distance along the channel-shaped rack for permitting said second spring to free the pawl from the teeth whereupon the leaf spring will swing the arm back into its inoperative position.

2. The combination as set forth in claim 1: and in which a. manually actuated means is provided for pressing on the pawl for overcoming the effect of said second spring on the pawl whereby the pawl can be manually swung into engagement with the teeth of said channel-shaped rack when the arm has been moved into operative position for causing the pawl to hold the arm in its operative position.

3. The combination as set forth in claim 2: and in which a. said arm carries an adjustable stop that will strike the base and prevent further swinging movement of the arm in the same direction;

b. whereby said leaf spring will hold the arm in its inoperative position.

4. The combination as set forth in claim 2: and in which a. said manually actuated means includes a pawl depresser swingable about the axis of said wheel; and b. said pawl depresser carrying a rod for contacting the pawl for swinging it into engagement with the teeth when the pawl depresser is swung in a clockwise direction about the axis of said wheel.

* * * * *